(12) United States Patent
Shirley, Jr. et al.

(10) Patent No.: US 10,360,107 B2
(45) Date of Patent: *Jul. 23, 2019

(54) MODIFYING ALLOCATION OF STORAGE RESOURCES IN A DISPERSED STORAGE NETWORK

(71) Applicant: International Business Machines Corporation, Armonk, NY (US)

(72) Inventors: Thomas F. Shirley, Jr., Wauwatosa, WI (US); Gary W. Grube, Barrington Hills, IL (US); Bart R. Cilfone, Marina del Ray, CA (US); Ravi V. Khadiwala, Bartlett, IL (US); Greg R. Dhuse, Chicago, IL (US); Thomas D. Cocagne, Elk Grove Village, IL (US); Michael Colin Storm, Palo Alto, CA (US); Yogesh R. Vedpathak, Chicago, IL (US); Wesley B. Leggette, Chicago, IL (US); Jason K. Resch, Chicago, IL (US); Andrew D. Baptist, Mt. Pleasant, WI (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,068

(22) Filed: Sep. 4, 2018

(65) Prior Publication Data

US 2018/0373595 A1 Dec. 27, 2018

Related U.S. Application Data

(63) Continuation of application No. 15/841,759, filed on Dec. 14, 2017, now Pat. No. 10,140,182, which is a
(Continued)

(51) Int. Cl.
*G06F 11/10* (2006.01)
*H04L 29/08* (2006.01)
(Continued)

(52) U.S. Cl.
CPC ............ *G06F 11/1092* (2013.01); *G06F 3/06* (2013.01); *G06F 21/62* (2013.01);
(Continued)

(58) Field of Classification Search
CPC .. G06F 11/1072; G06F 11/1092; G06F 21/64; G06F 21/62; G06F 21/6218;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Shelly A Chase
(74) *Attorney, Agent, or Firm* — Garlick & Markison; Timothy W. Markison; Bruce E. Stuckman

(57) ABSTRACT

A method for execution by a resource allocation module includes facilitating migration of a first set of encoded data slices stored at a storage unit for decommissioning to a newly commissioned storage unit, and facilitating migration of a remaining set of encoded data slices stored at the storage unit for decommissioning as foster encoded data slices to at least one other storage unit. For each foster encoded data slice, it is determined whether to facilitate migration of the foster encoded data slice to the newly commissioned storage unit. When determining to facilitate the migration of the foster encoded data slice, the migration of the foster encoded
(Continued)

data slice to the newly commissioned storage unit is facilitated. An association of the newly commissioned storage unit and identity of the foster encoded data slice is updated in response to detecting successful migration of the foster encoded data slice.

20 Claims, 8 Drawing Sheets

Related U.S. Application Data continuation-in-part of application No. 15/450,470, filed on Mar. 6, 2017, now Pat. No. 9,891,829, which is a continuation of application No. 14/589,639, filed on Jan. 5, 2015, now Pat. No. 9,665,429.

(60) Provisional application No. 61/944,722, filed on Feb. 26, 2014.

(51) Int. Cl.
  *H04L 29/06* (2006.01)
  *G06F 21/64* (2013.01)
  *G06F 21/62* (2013.01)
  *G06F 3/06* (2006.01)

(52) U.S. Cl.
  CPC .......... *G06F 21/6218* (2013.01); *G06F 21/64* (2013.01); *G06F 21/645* (2013.01); *H04L 63/10* (2013.01); *H04L 67/1097* (2013.01); *H04L 67/2823* (2013.01); *G06F 2211/1028* (2013.01); *G06F 2212/254* (2013.01); *H04L 63/0428* (2013.01); *H04L 63/101* (2013.01)

(58) Field of Classification Search
  CPC ......... G06F 21/645; G06F 3/06; H04L 63/10; H04L 67/1097; H04L 67/2823; H04L 63/101; H04L 63/0428
  See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2009/0144516 A1 | 6/2009 | Sandorfi | |
| 2010/0023524 A1 | 1/2010 | Gladwin et al. | |
| 2011/0072321 A1 | 3/2011 | Dhuse | |
| 2011/0214011 A1 | 9/2011 | Grube et al. | |
| 2011/0225362 A1 | 9/2011 | Leggette | |
| 2011/0311051 A1 | 12/2011 | Resch et al. | |
| 2012/0054456 A1 | 3/2012 | Grube et al. | |
| 2012/0102316 A1 | 4/2012 | Resch et al. | |
| 2012/0110390 A1 | 5/2012 | Grube et al. | |
| 2012/0137091 A1 | 5/2012 | Grube et al. | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema

(56) References Cited

OTHER PUBLICATIONS for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

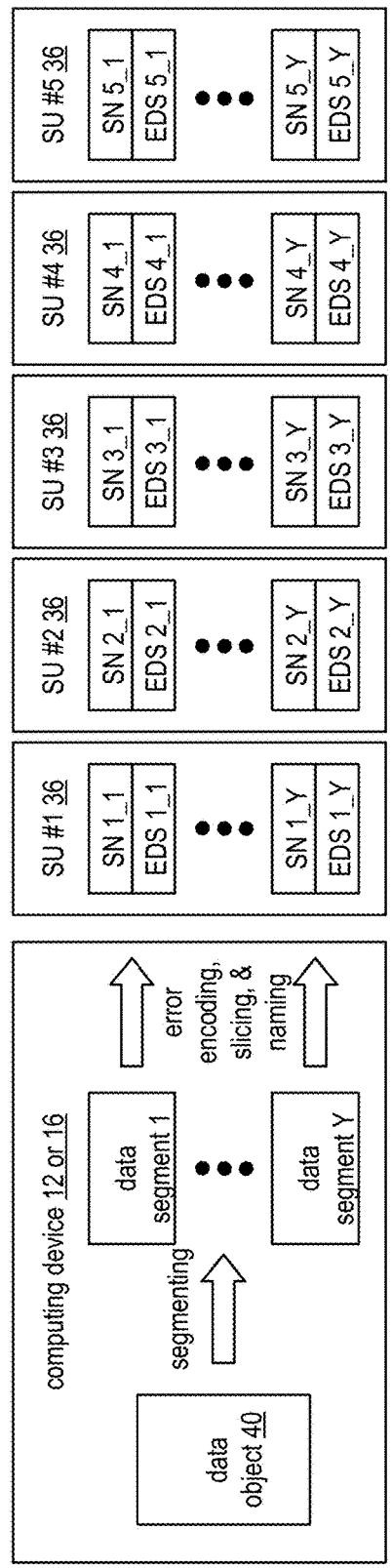
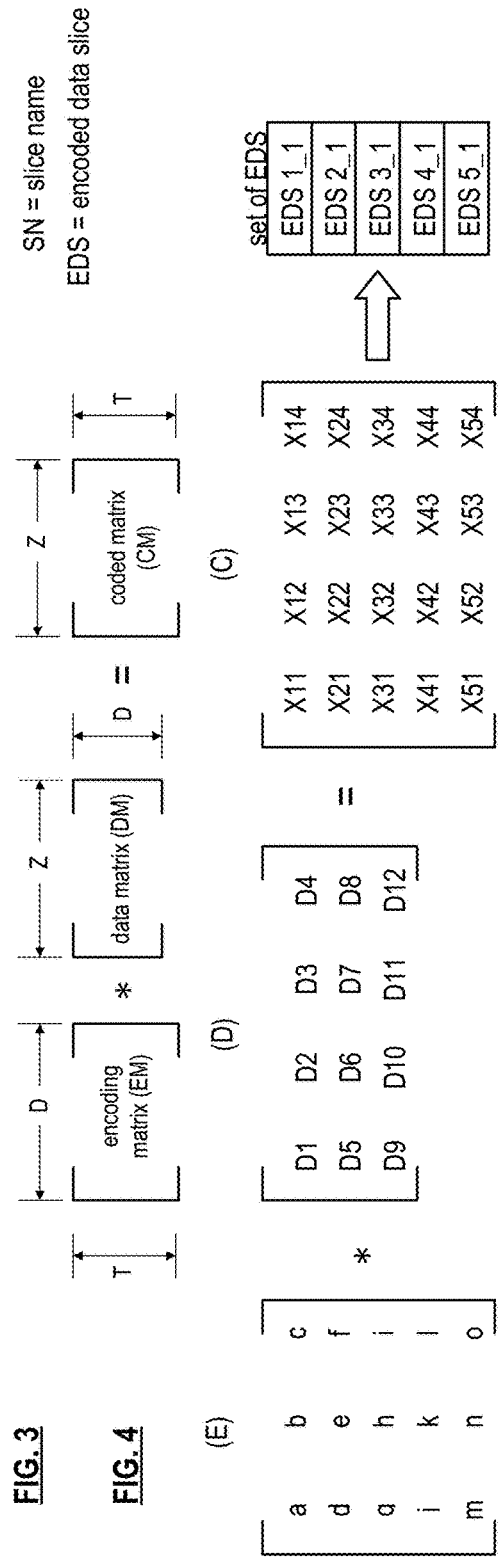
FIG. 3
FIG. 4
FIG. 5
FIG. 6

MODIFYING ALLOCATION OF STORAGE RESOURCES IN A DISPERSED STORAGE NETWORK

CROSS-REFERENCE TO RELATED APPLICATIONS

The present U.S. Utility patent application claims priority pursuant to 35 U.S.C. § 120 as a continuation of U.S. Utility application Ser. No. 15/841,759, entitled "MODIFYING ALLOCATION OF STORAGE RESOURCES IN A DISPERSED STORAGE NETWORK", filed Dec. 14, 2017, which is a continuation-in-part of U.S. Utility application Ser. No. 15/450,470, entitled "STORAGE OF DATA WITH VERIFICATION IN A DISPERSED STORAGE NETWORK", filed Mar. 6, 2017, issued as U.S. Pat. No. 9,891,829 on Feb. 13, 2018, which claims priority pursuant to 35 U.S.C. § 120 as a continuation of U.S. Utility application Ser. No. 14/589,639, entitled "STORAGE OF DATA WITH VERIFICATION IN A DISPERSED STORAGE NETWORK", filed Jan. 5, 2015, issued as U.S. Pat. No. 9,665,429 on May 30, 2017, which claims priority pursuant to 35 U.S.C. § 119(e) to U.S. Provisional Application No. 61/944,722, entitled "SELECTING RESOURCES OF A DISPERSED STORAGE NETWORK", filed Feb. 26, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
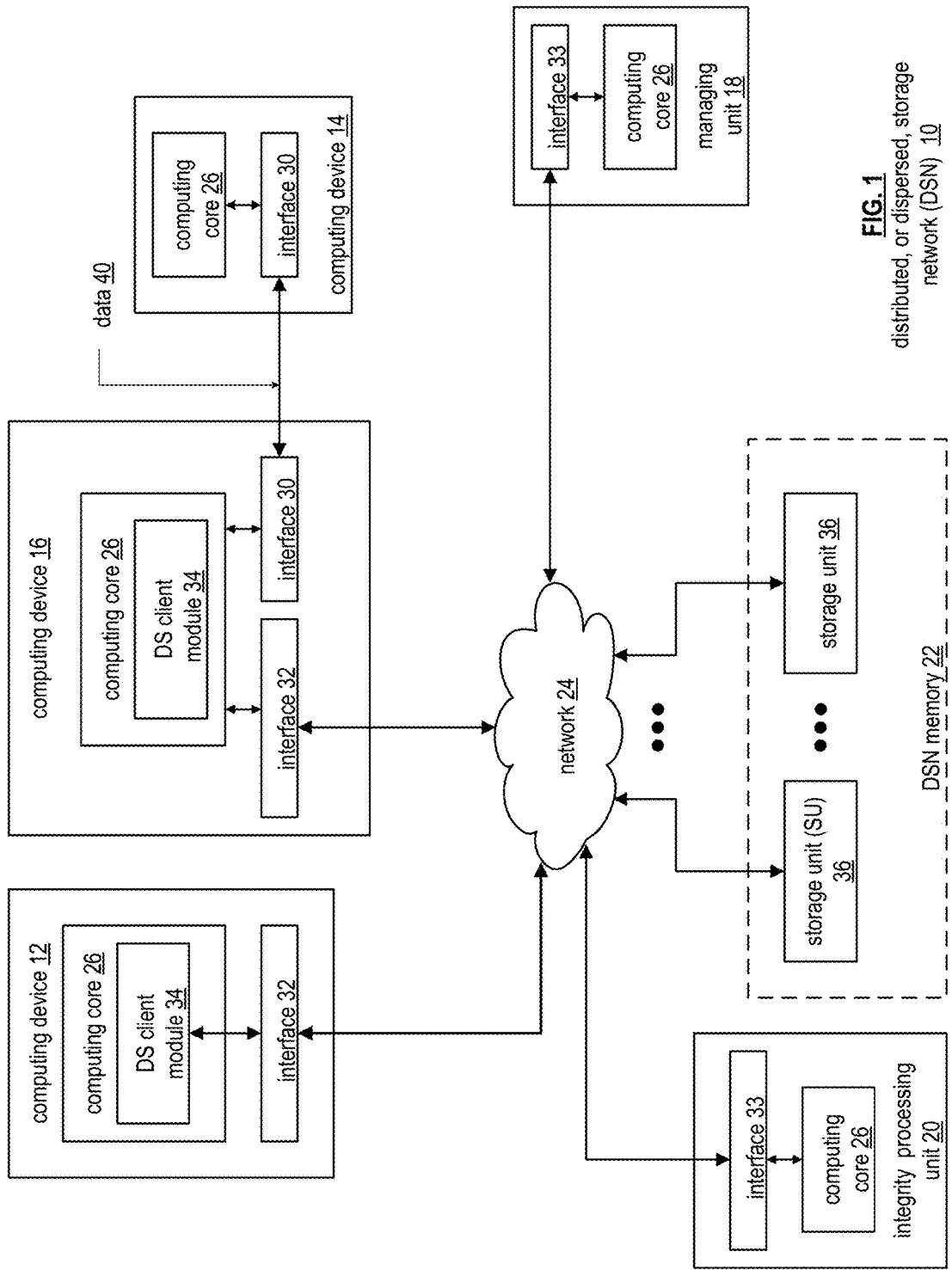
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
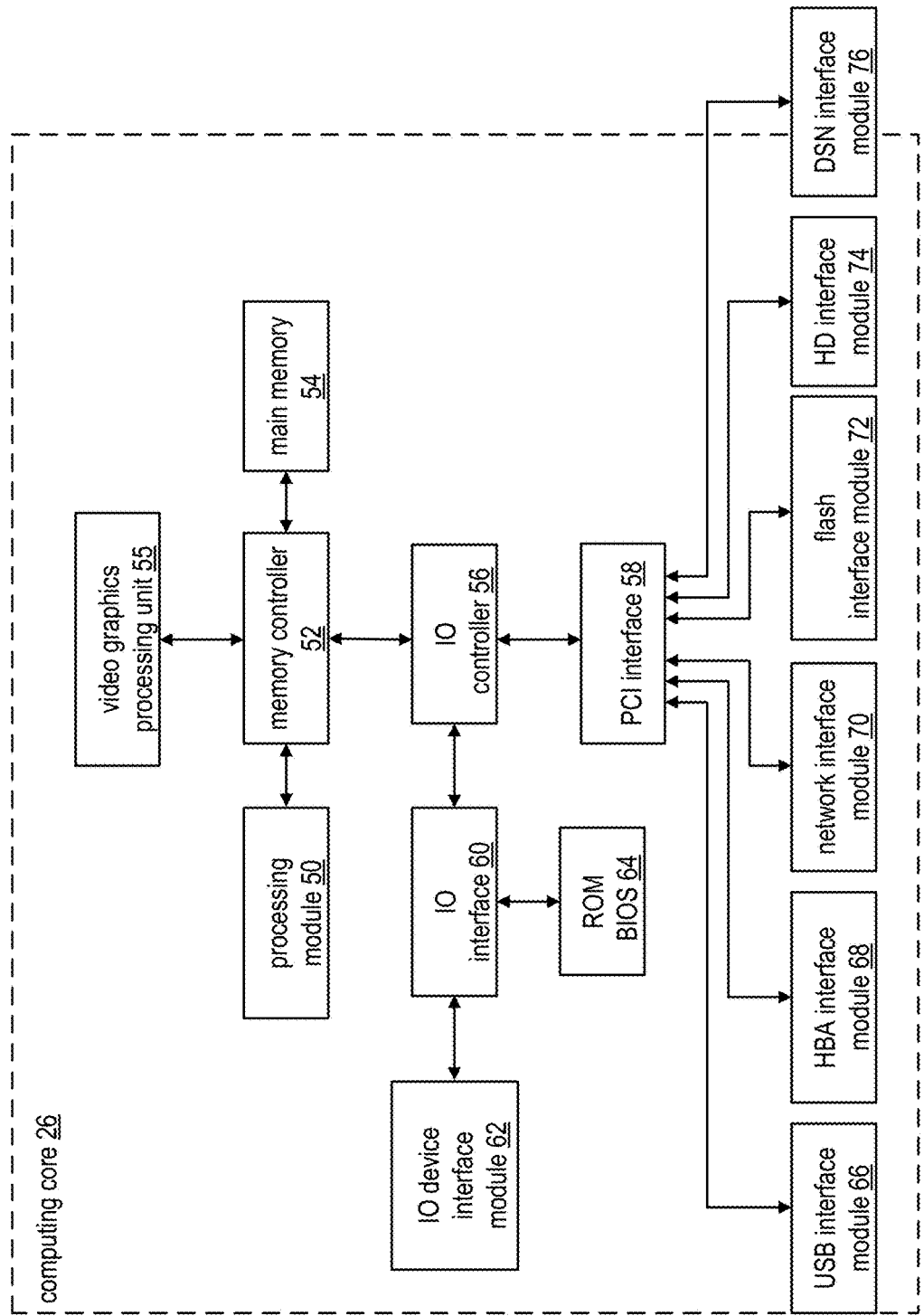
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
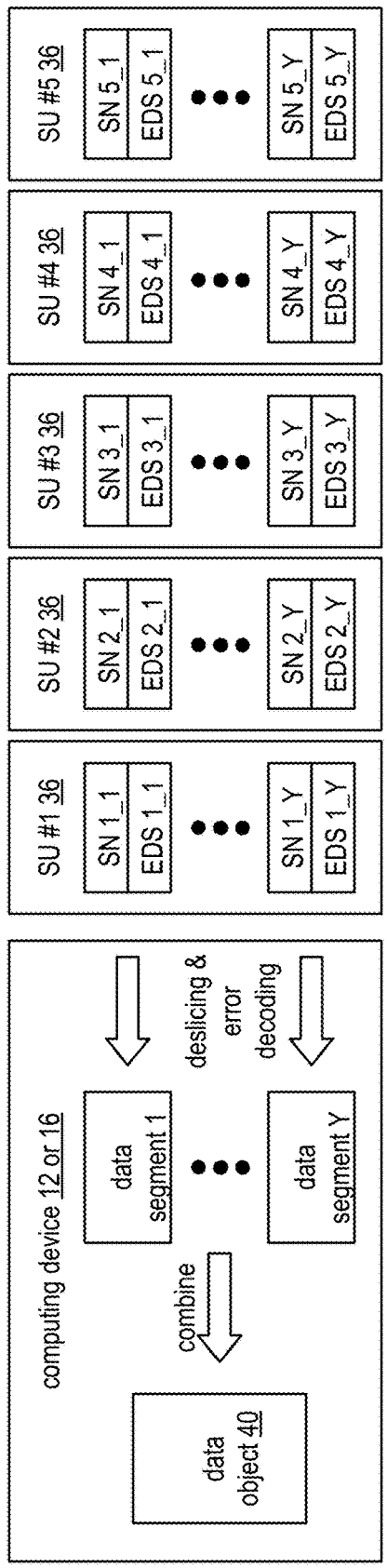
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
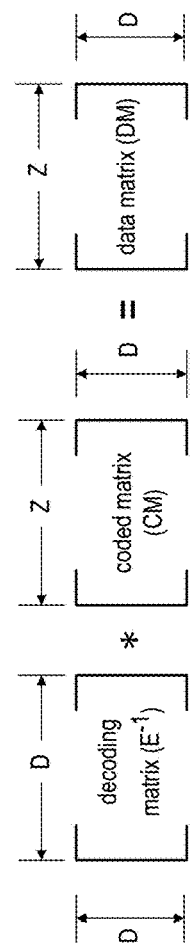
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
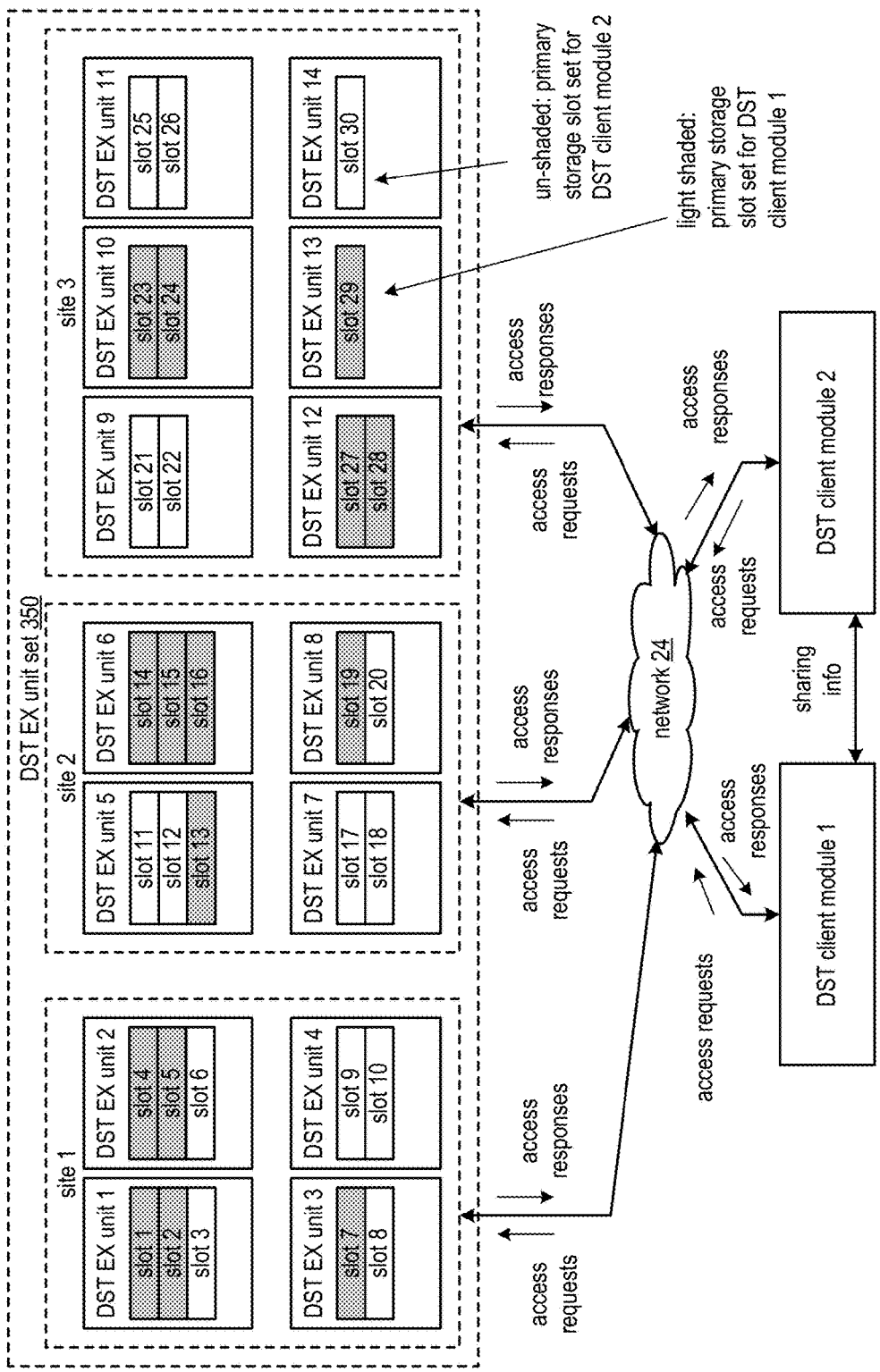
FIGS. 9-11 are schematic block diagrams of an embodiment of a dispersed or distributed storage network (DSN) in accordance with the present invention.

FIG. 9 is a schematic block diagram of an embodiment of a dispersed storage network (DSN) that includes at least two distributed storage and task (DST) client modules 1-2, the network 24 of FIG. 1, and a DST execution (EX) unit set 350. The DST client modules 1-2 may be implemented using the DS client module 34 of FIG. 1. The DST execution unit set 350 can include a set of storage units 36 of FIG. 1 operating as a distributed storage and task (DST) execution units, where each DST execution unit is operable to store dispersed error encoded data and/or to execute, in a distributed manner, one or more tasks on data. One or more DST execution units can be deployed at one or more sites. Each DST execution unit provides at least one storage slot of N storage slots. A storage slot includes a virtual storage location associated with physical memory of the DST execution unit. For example, the DST execution unit set includes DST execution units 1-14 when 30 storage slots are provided and a varying number of storage slots are associated with each DST execution unit.

Figure 10:
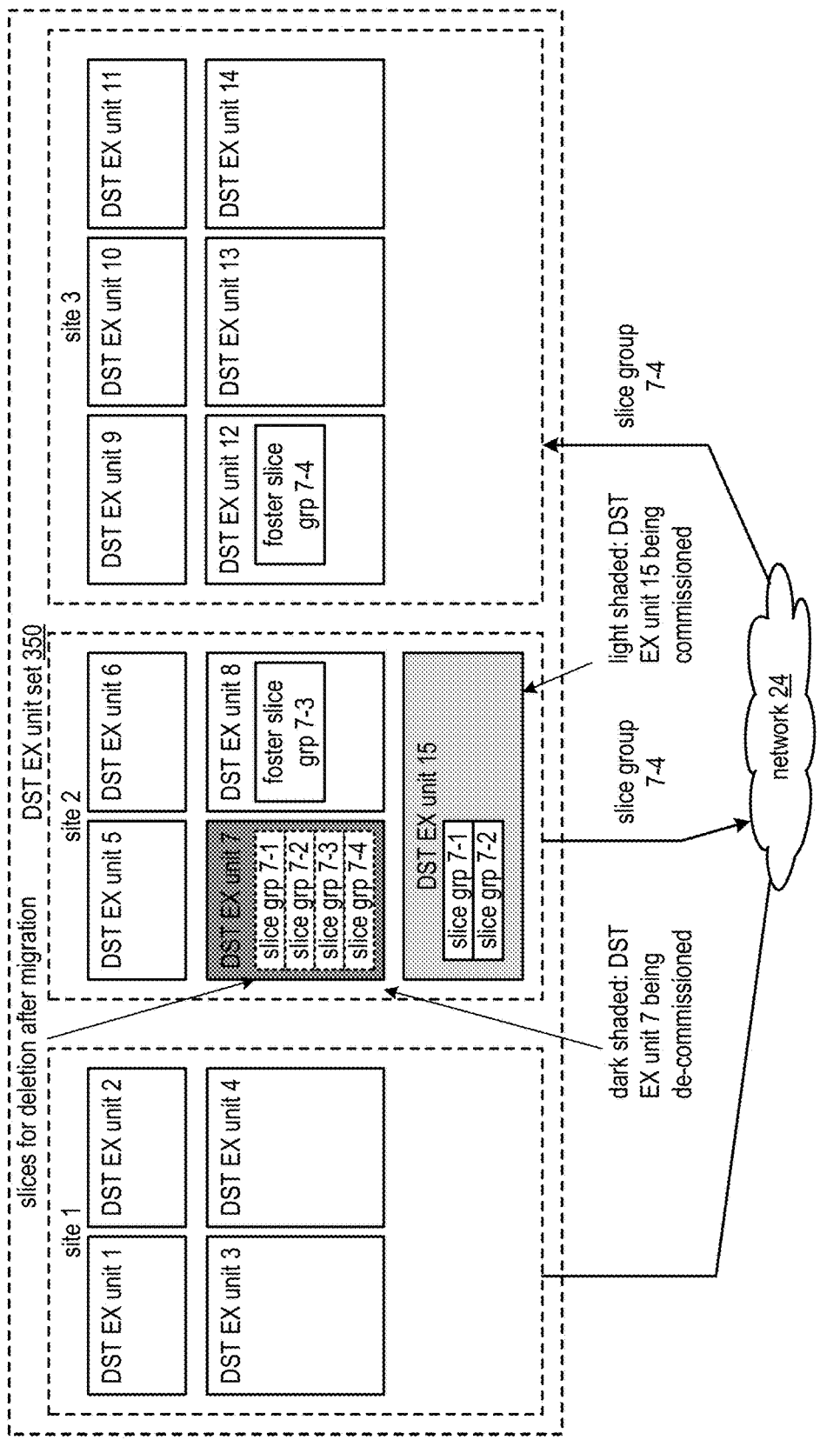
Figure 11:
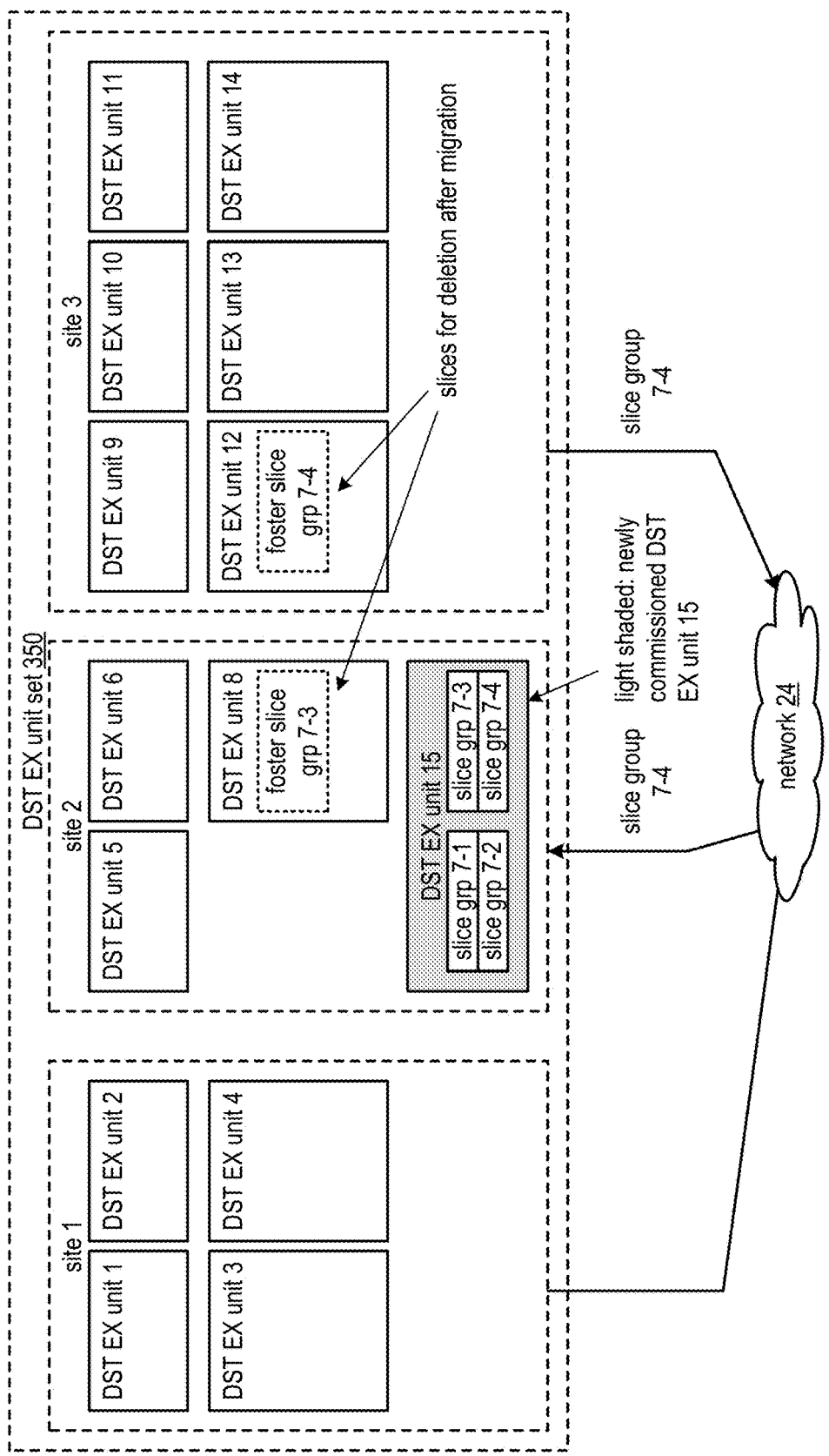

FIGS. 10-11 are schematic block diagrams of an embodiment of a dispersed storage network (DSN) illustrating an example of modifying allocation of storage resources. The DSN includes the network 24 of FIG. 1 and the distributed storage and task (DST) execution unit set 350 of FIG. 9, where an additional DST execution unit 15 is commissioned at site 2. Some or all DST execution units, computing device 12-16, managing unit 18, integrity processing unit 20, and/or another device communicating with network 24 can include a resource allocation module. The resource allocation module can be implemented by utilizing the DS client module 34, computing core 26, and/or by utilizing one or more processors and memory devices of the respective DST execution units, computing device 12-16, managing unit 18, integrity processing unit 20, and/or other device communicating with network 24. Alternatively, the resource allocation module can be a separate unit of the DSN, communicating bidirectionally with the network 24, and can include its own DS client module 34 and/or computing core 26. The DSN functions to modify allocation of storage resources.

Many situations involving movement, replacement, migration, etc. can be handled through a target-width paradigm to modify of the allocation of the storage resources in the DSN. For example, consider adding a new storage unit to the system, and assigning it responsibility for the namespace range of one storage unit, such as a decommissioned storage unit, while simultaneously removing the namespace responsibility for the decommissioned storage unit. In doing so, all the slices held by the decommissioned storage unit can immediately become foster slices. These foster slices can be migrated directly to the primary location, such as a replacement storage unit. In an alternate scenario, the foster slices can be migrated to other storage units which are secondary storage locations for the slices it holds. In this way, a storage unit can be decommissioned, its slices can be migrated as foster slices more or less equally across the DSN memory, and finally, when that storage unit is removed and replaced, normal foster-slice features can begin to migrate foster slices home, such as to the replacement store. In following this strategy, there is no time at which the slice in question is unavailable. Similar methods may be employed when moving a storage unit to a different site, and/or to preserve the logical ordering of the slice names across the physical locations. This strategy can also be utilized when performing replacement of a memory device, especially when the storage unit in question does not have the space to migrate slices off of the memory device. The failing memory device can block new writes, and all slices on it may be written as foster slices to other storage units. When the failed memory device is replaced, writes will be allowed and foster slices can be migrated back.

FIG. 10 illustrates initial steps of an example of the modifying of the allocation of the storage resources. As a specific example, a resource allocation module (e.g., of any DST execution unit, of a DST processing unit, etc.) can detect a newly commissioned DST execution unit (e.g., DST execution unit 15). The detecting can include at least one of receiving a message, interpreting system registry information, initiating a query, and/or receiving a query response. Having detected the newly commissioned DST execution unit, the resource allocations module can identify a corresponding DST execution unit for decommissioning (e.g., DST execution unit 7). The identifying can include at least one of receiving a message, interpreting the system registry information, initiating a query, receiving a query, identifying an association between the newly commissioned DST execution unit and the DST execution unit for decommissioning, and/or interpreting an error message.

Having identified the corresponding DST execution unit for decommissioning, the resource allocation module can facilitate migrating a portion of encoded data slices stored in the DST execution unit for decommissioning to the newly commissioned DST execution unit. The facilitating can include determining a portion of encoded data slices for migration based on one or more of a DSN performance level, DST execution unit performance levels, a predetermination, a migration goal, and/or an expected access frequency for the encoded data slices. For example, the resource allocation module determines the portion to include encoded data slices of slice groups 7-1 and 7-2 stored on DST execution unit 7. The facilitating can further include at least one of retrieving the encoded data slices of the portion from the DST execution unit for decommissioning and storing the encoded data slices in the newly commissioned DST execution unit; issuing a migration request to the DST execution unit for decommissioning; and/or issuing another migration requests to the newly commissioned DST execution unit. For example, the resource allocation module, when implemented within the DST execution unit 15, retrieves the encoded data slices of slice groups 7-1 and 7-2 from DST execution unit 7 and stores slice groups 7-1 and 7-2 locally in DST execution unit 15.

Having facilitated the migration of the portion of encoded data slices to the newly commissioned DST execution unit, the resource allocation module can facilitate migrating remaining portions of the encoded data slices to one or more other DST execution units as foster slices. The facilitating includes selecting the one or more other DST execution units based on one or more of DST execution unit storage capacity, DST execution unit performance, and DST execution unit availability. For example, the resource allocation module selects DST execution unit 8 for storage of foster encoded data slices for a slice group 7-3 and selects DST execution unit 12 for storage of foster encoded data slices for a slice group 7-4 when DST execution unit 8 have sufficient storage capacity and has superior DST execution unit slice transfer performance based on co-location with DST execution unit 7, and DST execution unit 12 has sufficient storage capacity for the foster encoded data slices of slice group 7-4.

The facilitating of the migration of the remaining portions of the encoded data slices can further include transferring the remaining portions of the encoded data slices. The transferring can include at least one of the resource allocation module retrieving the remaining portions of the encoded data slices from the DST execution unit for decommissioning and storing the remaining portions of the encoded data slices in a corresponding selected other DST execution unit; issuing a migration request to the DST execution unit for decommissioning; and/or issuing another migration requests to the other DST execution unit. For example, the resource allocation module can issue the migration request to the DST execution unit 8 instructing the DST execution unit 8 to retrieve the foster encoded data slice group 7-3 from the DST execution unit 7 for local storage within the DST execution unit 8. As another example, the resource allocation module can issue the other migration request to the DST execution unit 7 to send, via the network 24, the foster encoded data slice group 7-4 to the DST execution unit 12 for local storage within the DST execution unit 12.

Having facilitated the migration of the remaining portions of the encoded data slices, when detecting successful migration of an encoded data slice, the resource allocation manager can facilitate deletion of the encoded data slice from the DST execution unit for decommissioning. For example, the resource allocation module detects that foster encoded data slices are available to requesting entities when accessing sets of encoded data slices that includes the foster encoded data slices and deletes encoded data slices from storage at the DST execution unit 7, where the encoded data slices for deletion correspond to the foster encoded data slices.

FIG. 11 illustrates further steps of the example of the modifying of the allocation of the storage resources. As a specific example, for each foster encoded data slice, the resource allocation module can determine whether to facilitate migration of the foster encoded data slice to the newly commissioned DST execution unit. The determining can be based on one or more of a network performance level, a performance level of the newly commissioned DST execution unit, a performance level of another DST execution unit associated with storage of the foster encoded data slice, interpreting a schedule, and/or interpreting a system loading level. For example, the resource allocation manager determines to facilitate the migration of all of the foster encoded data slices from DST execution units 8 and 12 to DST execution unit 15 when the system loading level is below a system loading threshold level.

When facilitating the migration of the foster encoded data slice, the resource allocation module can facilitate the migration of the foster encoded data slice from a corresponding other DST execution unit to the newly commissioned DST execution unit as an encoded data slice associated with the newly commissioned DST execution unit. For example, the resource allocation manager issues a migration request to DST execution unit 15 instructing DST execution unit 15 to retrieve foster encoded data slice group 7-3 from DST execution unit 8 and to retrieve, via the network 24, the foster encoded data slice group 7-4 from DST execution unit 12.

When confirming successful migration of the foster encoded data slice, the resource allocation manager can update an association of the newly commissioned DST execution unit and identities of encoded data slices stored at the newly commissioned DST execution unit. For example, the resource allocation manager can receive a confirmation message (e.g., a set of favorable write slice responses) from DST execution unit 15 indicating that foster encoded data slice groups 7-3 and 7-4 have been successfully stored in the DST execution unit 15 as encoded data slice groups 7-3 and 7-4. Having received the confirmation message, the resource allocation manager can update at least one of a dispersed storage network (DSN) directory and a dispersed hierarchical index to indicate the association of slice names of the migrated foster encoded data slices and the DST execution unit 15.

Having updated the association of the newly commissioned DST execution unit and the identities of the encoded data slices stored at the newly commissioned DST execution unit, the resource allocation manager can facilitate deleting the foster encoded data slices. For example, the resource allocation manager can issues delete slice requests to DST execution units 8 and 12 to delete the foster encoded data slice groups 7-3 and 7-4.

In various embodiments, a processing system of a resource allocation module includes at least one processor and a memory that stores operational instructions, that when executed by the at least one processor cause the processing system to detect a newly commissioned storage unit, where a set of storage units includes the newly commissioned storage unit. A corresponding storage unit of the set of storage units is identified for decommissioning. Migration of a first set of a plurality of encoded data slices stored at the corresponding storage unit for decommissioning to the newly commissioned storage unit is facilitated. Migration of a remaining set of the plurality of encoded data slices stored at the corresponding storage unit for decommissioning to at least one other storage unit of the set of storage units for storage as a set of foster encoded data slices is facilitated. Deletion of the plurality of encoded data slices from the corresponding storage unit for decommissioning is facilitated in response to detecting successful migration of the first set of the plurality of encoded data slices. For each foster encoded data slice, it is determined whether to facilitate migration of the foster encoded data slice to the newly commissioned storage unit. When determining to facilitate the migration of the foster encoded data slice, the migration of the foster encoded data slice from a corresponding other storage unit to the newly commissioned storage unit as an encoded data slice associated with the newly commissioned storage unit is facilitated. An association of the newly commissioned storage unit and identity of the foster encoded data slice is updated in response to detecting successful migration of the foster encoded data slice. Deletion of the foster encoded data slice from the corresponding other storage unit is facilitated in response to detecting successful migration of the foster encoded data slice to the newly commissioned storage unit.

In various embodiments, the resource allocation module is implemented within the newly commissioned storage unit. In various embodiments, facilitating the migration of the first set of the plurality of encoded data slices includes selecting a subset of the plurality of encoded data slices to be included in the first set of the plurality of encoded data slices. In various embodiments, the subset of the plurality of encoded data slices are selected based on an expected access frequency for the encoded data slices. In various embodiments, selecting the subset of the plurality of encoded slices to be included in the first set includes determining a number of encoded slices to be included in the first set. In various embodiments, half of the encoded data slices of the plurality of encoded data slices are selected to be included in the first set in response to determining a performance level of the newly commissioned storage unit compares favorably to a low performance threshold level and compares unfavorably to a high performance threshold level.

In various embodiments, facilitating the migration of the remaining set of the plurality of encoded data slices includes selecting the at least one other storage unit based on at a storage capacity of the at least one other storage unit. In various embodiments, determining whether to facilitate the migration of the each foster encoded data slice is based on a performance level of the newly commissioned storage unit. In various embodiments, determining whether to facilitate the migration of the each foster encoded data slice includes determining whether a system loading level compares favorably to a system loading threshold level. In various embodiments, updating the association of the newly commissioned storage unit and the identity of the each foster encoded data slice includes updating a dispersed hierarchical index to indicate the association of a slice name of the each foster encoded data slice and the newly commissioned storage unit.

Figure 12:
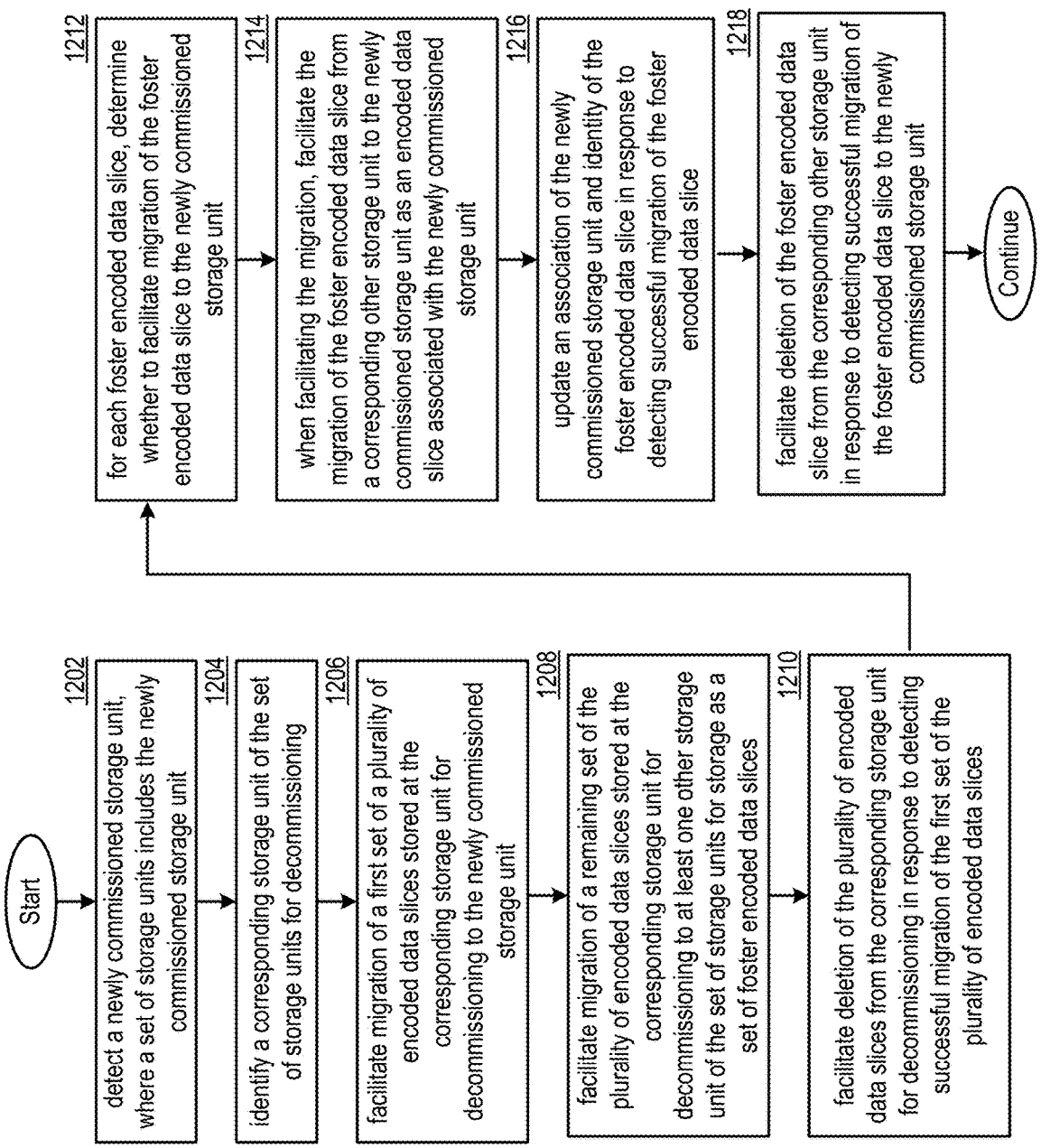
FIG. 12 is a logic diagram of an example of a method of modifying allocation of storage resources in accordance with the present invention.

FIG. 12 is a flowchart illustrating an example of modifying allocation of storage resources. In particular, a method is presented for use in association with one or more functions and features described in conjunction with FIGS. 1-9, for execution by a processing system of a dispersed storage and task (DST) execution unit, a processing system of a resource allocation module, and/or another processing system of the network 24 that includes at least one processor and memory. The memory can store operational instructions that configure the processor or processors to perform the steps described below. The processor or processors of the processing system can be implemented by utilizing processing module 50, and/or the memory of the processing system can be implemented by utilizing main memory 54 of FIG. 2.

The method begins or continues at step 1202 where a distributed storage and task module (e.g., of a distributed storage and task (DST) execution unit, of a resource allocation module) detects a newly commissioned storage unit, where a set of storage units includes the newly commissioned storage unit. The method continues at step 1204 where the processing system identifies a corresponding storage unit for decommissioning, where the set of storage units includes the storage unit for decommissioning.

The method continues at step 1206 where the processing system facilitates migration of a first set of a plurality of encoded data slices stored at the corresponding storage unit for decommissioning to the newly commissioned storage unit. The facilitating can include determining a size of the set, selecting slices to be included in the set, and/or facilitating a transfer of the portion of the encoded data slices. For example, the processing system determines to not send any encoded data slices to the newly commissioned storage unit when the newly commissioned storage unit is associated with a performance level that is less than a low performance threshold level. As another example, the processing system determines to send all of the encoded data slices to the newly commissioned storage unit when the performance level of the newly commissioned storage unit is greater than a high performance threshold level. As yet another example, the processing system determines to send half of the encoded data slices to the newly commissioned storage unit when the performance level of the newly commissioned storage unit is greater than the low performance threshold level and less than the high performance threshold level. Having selected the number of encoded data slices for the migration, the processing system facilitates a transfer of the selected number of encoded data slices. For example, the processing system identifies the selected encoded data slices (e.g., by slice name) and issues a migration request to the newly commissioned storage unit to retrieve the selected encoded data slices from the storage unit for decommissioning.

The method continues at step 1208 where the processing system facilitates migration of a remaining set of the plurality of encoded data slices stored at the corresponding storage unit for decommissioning to at least one other storage unit of the set of storage units for storage as a set of foster encoded data slices. The facilitating includes selecting the other storage units and facilitating a transfer of some or all of the set of slices of the plurality of encoded data slices not included in the first set. When detecting successful migration of encoded data slice, the method continues at step 1210 where the processing system facilitates deletion of the plurality of encoded data slices from the corresponding storage unit for decommissioning in response to detecting successful migration of the first set of the plurality of encoded data slices. For example, the processing system detects favorable write slice responses and issues a delete slice request to the storage unit for decommissioning.

For each foster encoded data slice, the method continues at step 1212 where the processing system determines whether to facilitate migration of the foster encoded data slice to the newly commissioned storage unit. The determining may be based on one or more of interpreting a schedule, interpreting a system performance level, and interpreting a system loading level. When facilitating the migration, the method continues at step 1214 where the processing system facilitates the migration of the foster encoded data slice from a corresponding other storage unit to the newly commissioned storage unit as an encoded data slice associated with the newly commissioned storage unit. For example, the processing system retrieves the foster encoded data slice from the corresponding other storage unit and issues a write slice request to the newly commissioned storage unit, where the write slice request includes the foster encoded data slice.

When confirming successful migration of the foster encoded data slice, the method continues at step 1216 where the processing system updates an association of the newly commissioned storage unit and identities of encoded data slices migrated to the newly commissioned storage unit. The updating of the association includes at least one of updating a dispersed storage network directory, and updating a dispersed hierarchical index. The method continues at step 1218 where the processing system facilitates deletion of the foster encoded data slice from the corresponding other storage unit in response to detecting successful migration of the foster encoded data slice to the newly commissioned storage unit. For example, the processing system issues a delete slice request to the corresponding other storage unit for deletion of the foster encoded data slice.

In various embodiments, a non-transitory computer readable storage medium includes at least one memory section that stores operational instructions that, when executed by a processing system of a dispersed storage network (DSN) that includes a processor and a memory, causes the processing system to detect a newly commissioned storage unit, where a set of storage units includes the newly commissioned storage unit. A corresponding storage unit of the set of storage units is identified for decommissioning. Migration of a first set of a plurality of encoded data slices stored at the corresponding storage unit for decommissioning to the newly commissioned storage unit is facilitated. Migration of a remaining set of the plurality of encoded data slices stored at the corresponding storage unit for decommissioning to at least one other storage unit of the set of storage units for storage as a set of foster encoded data slices is facilitated. Deletion of the plurality of encoded data slices from the corresponding storage unit for decommissioning is facilitated in response to detecting successful migration of the first set of the plurality of encoded data slices. For each foster encoded data slice, it is determined whether to facilitate migration of the foster encoded data slice to the newly commissioned storage unit. When determining to facilitate the migration of the foster encoded data slice, the migration of the foster encoded data slice from a corresponding other storage unit to the newly commissioned storage unit as an encoded data slice associated with the newly commissioned storage unit is facilitated. An association of the newly commissioned storage unit and identity of the foster encoded data slice is updated in response to detecting successful migration of the foster encoded data slice. Deletion of the foster encoded data slice from the corresponding other storage unit is facilitated in response to detecting successful migration of the foster encoded data slice to the newly commissioned storage unit.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a resource allocation module that includes a processor, the method comprises:
    facilitating migration of a first set of a plurality of encoded data slices stored at a corresponding storage unit for decommissioning of a set of storage units to a newly commissioned storage unit;
    facilitate migration of a remaining set of the plurality of encoded data slices stored at the corresponding storage unit for decommissioning to at least one other storage unit of the set of storage units for storage as a set of foster encoded data slices;
    facilitating deletion of the plurality of encoded data slices from the corresponding storage unit for decommissioning in response to detecting successful migration of the first set of the plurality of encoded data slices;
    for each foster encoded data slice:
        determining whether to facilitate migration of the each foster encoded data slice to the newly commissioned storage unit;
        when determining to facilitate the migration of the each foster encoded data slice, facilitating the migration of the each foster encoded data slice from a corresponding other storage unit to the newly commissioned storage unit as an encoded data slice associated with the newly commissioned storage unit;
        updating an association of the newly commissioned storage unit and identity of the each foster encoded data slice in response to detecting successful migration of the each foster encoded data slice; and
        facilitating deletion of the each foster encoded data slice from the corresponding other storage unit in response to detecting successful migration of the each foster encoded data slice to the newly commissioned storage unit.

2. The method of claim 1, wherein the resource allocation module is implemented within the newly commissioned storage unit.

3. The method of claim 1, wherein facilitating the migration of the first set of the plurality of encoded data slices includes selecting a subset of the plurality of encoded data slices to be included in the first set of the plurality of encoded data slices.

4. The method of claim 3, wherein the subset of the plurality of encoded data slices are selected based on an expected access frequency for the encoded data slices.

5. The method of claim 3, wherein selecting the subset of the plurality of encoded slices to be included in the first set includes determining a number of encoded slices to be included in the first set.

6. The method of claim 3, wherein half of the encoded data slices of the plurality of encoded data slices are selected to be included in the first set in response to determining a performance level of the newly commissioned storage unit compares favorably to a low performance threshold level and compares unfavorably to a high performance threshold level.

7. The method of claim 1, wherein facilitating the migration of the remaining set of the plurality of encoded data slices includes selecting the at least one other storage unit based on at a storage capacity of the at least one other storage unit.

8. The method of claim 1, wherein determining whether to facilitate the migration of the each foster encoded data slice is based on a performance level of the newly commissioned storage unit.

9. The method of claim 1, wherein determining whether to facilitate the migration of the each foster encoded data slice includes determining whether a system loading level compares favorably to a system loading threshold level.

10. The method of claim 1, wherein updating the association of the newly commissioned storage unit and the identity of the each foster encoded data slice includes updating a dispersed hierarchical index to indicate the association of a slice name of the each foster encoded data slice and the newly commissioned storage unit.

11. A processing system of a resource allocation module comprises:
    at least one processor;
    a memory that stores operational instructions, that when executed by the at least one processor cause the processing system to:
        facilitate migration of a first set of a plurality of encoded data slices stored at a corresponding storage unit for decommissioning of a set of storage units to a newly commissioned storage unit;
        facilitate migration of a remaining set of the plurality of encoded data slices stored at the corresponding storage unit for decommissioning to at least one other storage unit of the set of storage units for storage as a set of foster encoded data slices;
        facilitate deletion of the plurality of encoded data slices from the corresponding storage unit for decommissioning in response to detecting successful migration of the first set of the plurality of encoded data slices;
        for each foster encoded data slice in the set of foster encoded data slices:
            determine whether to facilitate migration of the each foster encoded data slice to the newly commissioned storage unit;
            when determining to facilitate the migration of the each foster encoded data slice, facilitate the migration of the each foster encoded data slice from a corresponding other storage unit to the newly commissioned storage unit as an encoded data slice associated with the newly commissioned storage unit;
            update an association of the newly commissioned storage unit and identity of the each foster encoded data slice in response to detecting successful migration of the each foster encoded data slice; and
            facilitate deletion of the each foster encoded data slice from the corresponding other storage unit in response to detecting successful migration of the each foster encoded data slice to the newly commissioned storage unit.

12. The processing system of claim 11, wherein the resource allocation module is implemented within the newly commissioned storage unit.

13. The processing system of claim 11, wherein facilitating the migration of the first set of the plurality of encoded data slices includes selecting a subset of the plurality of encoded data slices to be included in the first set of the plurality of encoded data slices.

14. The processing system of claim 13, wherein the subset of the plurality of encoded data slices are selected based on an expected access frequency for the encoded data slices.

15. The processing system of claim 13, wherein selecting the subset of the plurality of encoded slices to be included in the first set includes determining a number of encoded slices to be included in the first set.

16. The processing system of claim 13, wherein half of the encoded data slices of the plurality of encoded data slices are selected to be included in the first set in response to determining a performance level of the newly commissioned storage unit compares favorably to a low performance threshold level and compares unfavorably to a high performance threshold level.

17. The processing system of claim 11, wherein facilitating the migration of the remaining set of the plurality of encoded data slices includes selecting the at least one other storage unit based on at a storage capacity of the at least one other storage unit.

18. The processing system of claim 11, wherein determining whether to facilitate the migration of the each foster encoded data slice includes determining whether a system loading level compares favorably to a system loading threshold level.

19. The processing system of claim 11, wherein updating the association of the newly commissioned storage unit and the identity of the each foster encoded data slice includes updating a dispersed hierarchical index to indicate the association of a slice name of the each foster encoded data slice and the newly commissioned storage unit.

20. A non-transitory computer readable storage medium comprises:
    at least one memory section that stores operational instructions that, when executed by a processing system of a dispersed storage network (DSN) that includes a processor and a memory, causes the processing system to:
    facilitate migration of a first set of a plurality of encoded data slices stored at a corresponding storage unit for decommissioning of a set of storage units to a newly commissioned storage unit;
    facilitate migration of a remaining set of the plurality of encoded data slices stored at the corresponding storage unit for decommissioning to at least one other storage unit of the set of storage units for storage as a set of foster encoded data slices;
    facilitate deletion of the plurality of encoded data slices from the corresponding storage unit for decommissioning in response to detecting successful migration of the first set of the plurality of encoded data slices;
    for each foster encoded data slice:
        determine whether to facilitate migration of the each foster encoded data slice to the newly commissioned storage unit;
        when determining to facilitate the migration of the each foster encoded data slice, facilitate the migration of the each foster encoded data slice from a corresponding other storage unit to the newly commissioned storage unit as an encoded data slice associated with the newly commissioned storage unit;
        update an association of the newly commissioned storage unit and identity of the each foster encoded data slice in response to detecting successful migration of the each foster encoded data slice; and
        facilitate deletion of the each foster encoded data slice from the corresponding other storage unit in response to detecting successful migration of the each foster encoded data slice to the newly commissioned storage unit.

* * * * *